(12) United States Patent
Guzman

(10) Patent No.: US 12,139,219 B1
(45) Date of Patent: Nov. 12, 2024

(54) WALKING ROBOT

(71) Applicant: Luis Guzman, Suwanee, GA (US)

(72) Inventor: Luis Guzman, Suwanee, GA (US)

( * ) Notice: Subject to any disclaimer, the term of this patent is extended or adjusted under 35 U.S.C. 154(b) by 523 days.

(21) Appl. No.: 17/521,948

(22) Filed: Nov. 9, 2021

Related U.S. Application Data

(60) Provisional application No. 63/213,412, filed on Jun. 22, 2021.

(51) Int. Cl.
*B62D 57/032* (2006.01)

(52) U.S. Cl.
CPC ................... *B62D 57/032* (2013.01)

(58) Field of Classification Search
CPC .................................................. B62D 57/032
See application file for complete search history.

(56) References Cited

U.S. PATENT DOCUMENTS

| | | | |
|---|---|---|---|
| D292,110 S | 9/1987 | Tamakoshi | |
| 5,158,493 A * | 10/1992 | Morgrey | B62D 57/02 901/1 |
| 6,831,437 B2 * | 12/2004 | Filo | B62D 57/032 318/568.22 |
| 8,020,649 B2 | 9/2011 | Ogawa | |
| 8,511,964 B2 | 8/2013 | Linn | |
| 9,359,028 B2 | 6/2016 | Jun | |
| 11,453,128 B2 * | 9/2022 | Yamagishi | B62D 57/032 |
| 2003/0009259 A1 | 1/2003 | Hattori | |
| 2005/0173164 A1 | 8/2005 | Maslov | |
| 2009/0321150 A1 | 12/2009 | Kwon | |
| 2012/0259463 A1 * | 10/2012 | Orita | B62D 57/00 901/1 |
| 2013/0158712 A1 | 6/2013 | Lee | |
| 2014/0039675 A1 | 2/2014 | Ead | |
| 2018/0354143 A1 * | 12/2018 | Dorfman | H04L 63/029 |
| 2020/0369333 A1 * | 11/2020 | Lavalley | B25J 11/0035 |

FOREIGN PATENT DOCUMENTS

WO 2014174487 A2 10/2014

* cited by examiner

*Primary Examiner* — Tony H Winner
*Assistant Examiner* — Hosam Shabara
(74) *Attorney, Agent, or Firm* — Kyle A. Fletcher, Esq.

(57) ABSTRACT

The walking robot is an electromechanical device. The walking robot is an automatic device. The walking robot is a mobile device. The walking robot incorporates a superior structure, an inferior structure, and a control circuit. The superior structure attaches to the inferior structure. The control circuit mounts in either the superior structure or the inferior structure. The inferior structure provides the motive forces the move the walking robot. The inferior structure allows the walking robot to walk. The control circuit generates the motive forces and coordinating systems that allow the inferior structure to walk.

13 Claims, 4 Drawing Sheets

WALKING ROBOT

CROSS REFERENCES TO RELATED APPLICATIONS

This non-provisional patent application claims priority to provisional patent application 63/213,412 that was filed on Jun. 22, 2021 by the applicant Luis Guzman.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of a structure with walking members. (B62D57/00)

SUMMARY OF INVENTION

The walking robot is an electromechanical device. The walking robot is an automatic device. The walking robot is a mobile device. The walking robot comprises a superior structure, an inferior structure, and a control circuit. The superior structure attaches to the inferior structure. The control circuit mounts in a structure selected from the group consisting of the superior structure and the inferior structure. The inferior structure provides the motive forces that move the walking robot. The inferior structure allows the walking robot to walk. The control circuit generates the motive forces and coordinating systems that allow the inferior structure to walk. The term walk is defined elsewhere in this disclosure.

These together with additional objects, features and advantages of the walking robot will be readily apparent to those of ordinary skill in the art upon reading the following detailed description of the presently preferred, but nonetheless illustrative, embodiments when taken in conjunction with the accompanying drawings.

In this respect, before explaining the current embodiments of the walking robot in detail, it is to be understood that the walking robot is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the walking robot.

It is therefore important that the claims be regarded as including such equivalent construction insofar as they do not depart from the spirit and scope of the walking robot. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
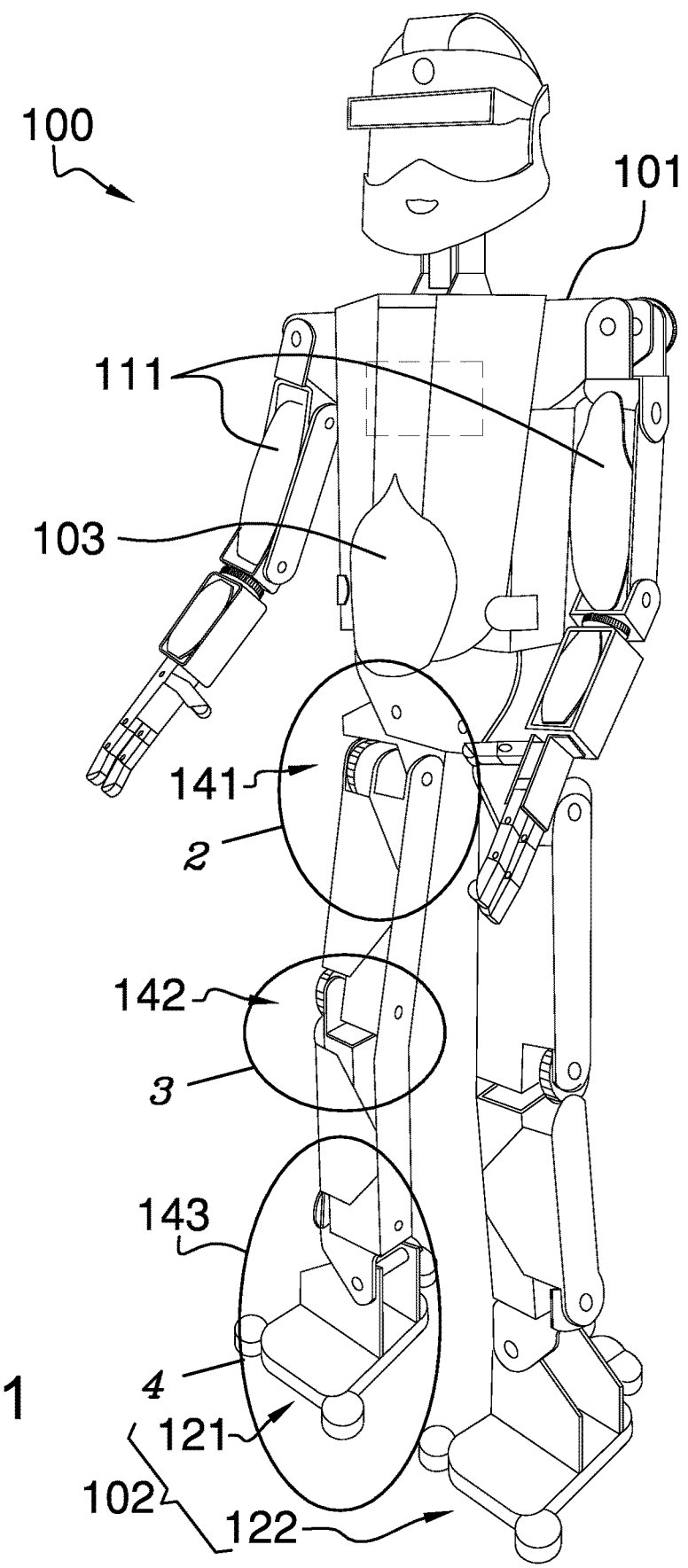
FIG. 1 is a front view of an embodiment of the disclosure.
Figure 2:
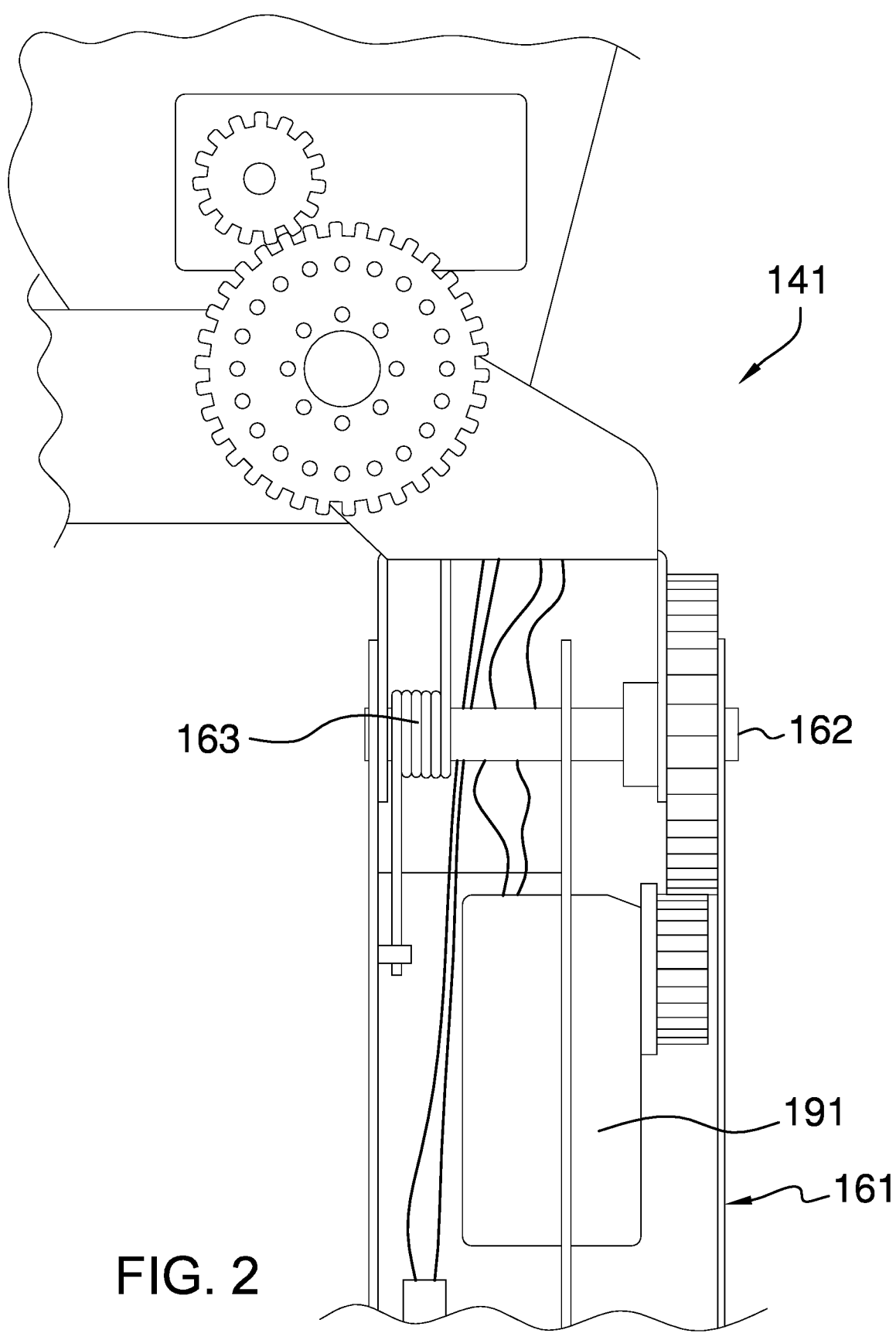
FIG. 2 is a cross-sectional view of an embodiment of the disclosure along line 2-2 in FIG. 1.
Figure 3:
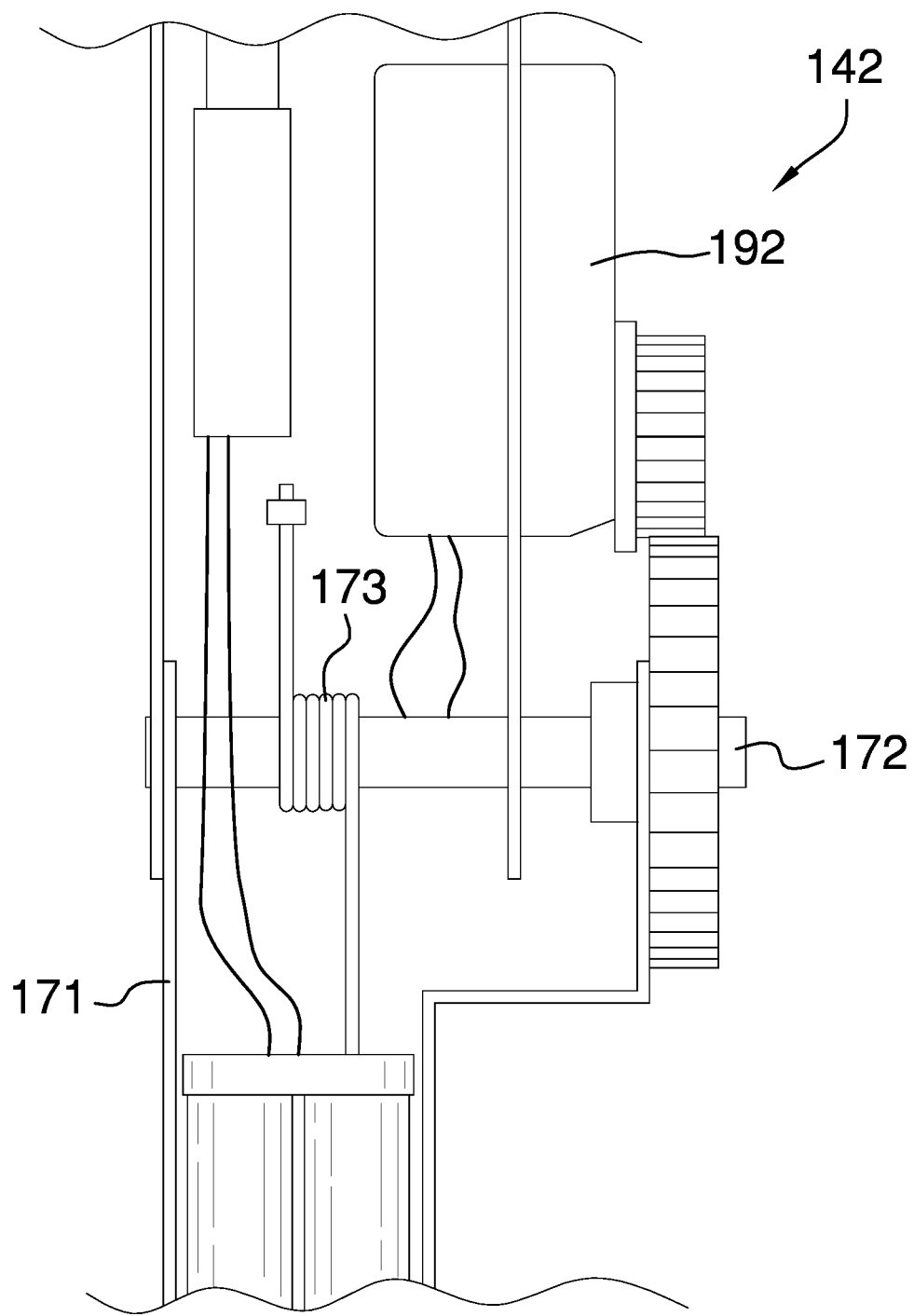
FIG. 3 is a cross-sectional view of an embodiment of the disclosure along line 3-3 in FIG. 1.
Figure 4:
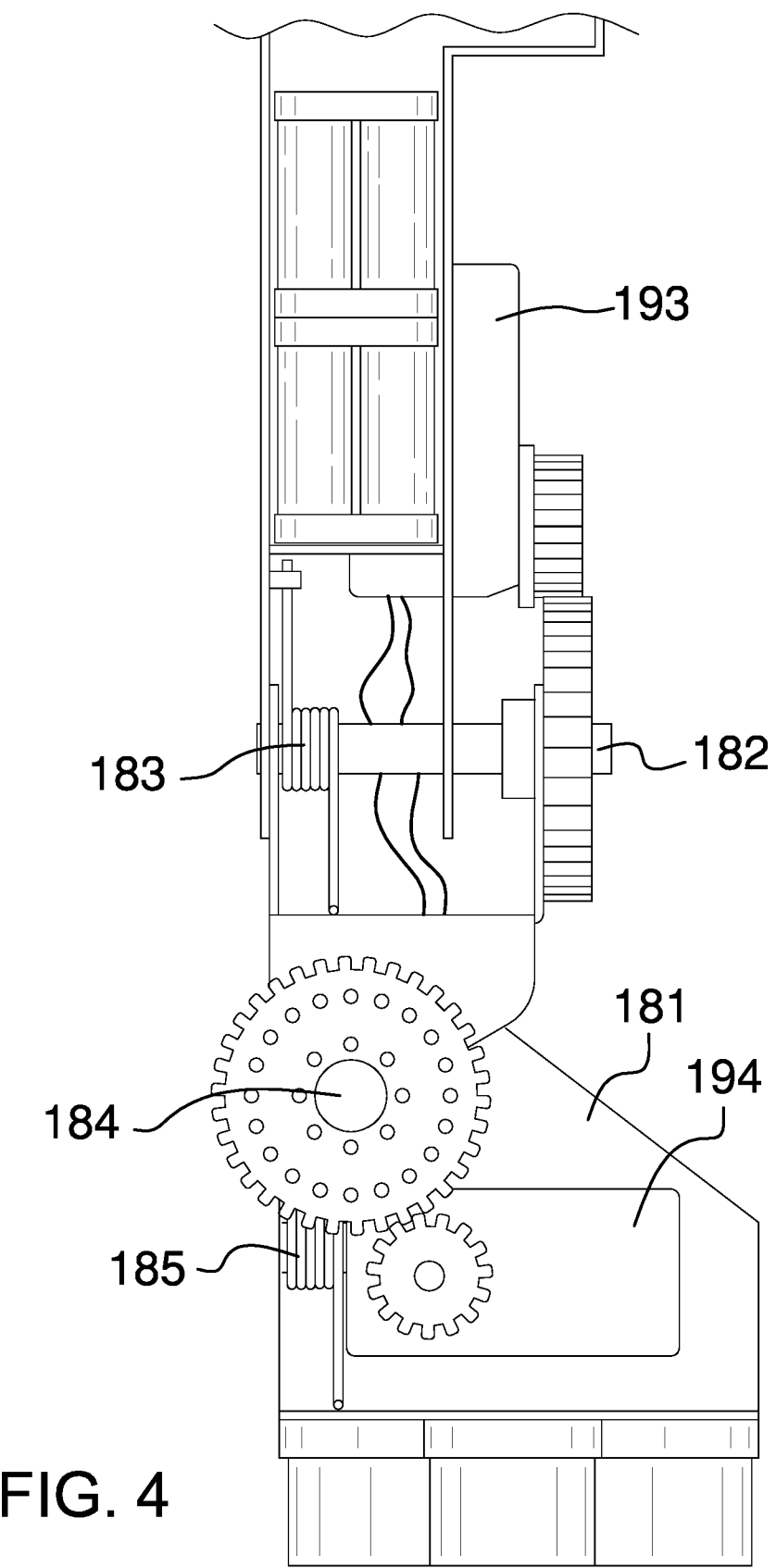
FIG. 4 is a cross-sectional view of an embodiment of the disclosure along line 4-4 in FIG. 1.

Detailed reference will now be made to one or more potential embodiments of the disclosure, which are illustrated in FIGS. 1 through 4.

The walking robot 100 (hereinafter invention) is an electromechanical device. The invention 100 is an automatic device. The invention 100 is a mobile device. The invention comprises a superior structure 101, an inferior structure 102, and a control circuit 103. The superior structure 101 attaches to the inferior structure 102. The control circuit 103 mounts in a structure selected from the group consisting of the superior structure 101 and the inferior structure 102. The inferior structure 102 provides the motive forces that move the invention 100. The inferior structure 102 allows the invention 100 to walk. The control circuit 103 generates the motive forces and coordinating systems that allow the inferior structure 102 to walk. The term walk is defined elsewhere in this disclosure.

The superior structure 101 is a mechanical structure. The superior structure 101 forms the structure of the invention 100 that is in a superior position relative to the inferior structure 102. The superior structure 101 is the robot that performs the function that is automated by the invention 100. The superior structure 101 attaches to the inferior structure 102. The inferior structure 102 is an electromechanical structure. The inferior structure 102 forms a stanchion structure (legs) that elevates the superior structure 101 above a supporting surface. Each stanchion structure of the inferior structure 102 attaches to the superior structure 101 such that each stanchion structure rotates relative to the superior structure 101. The rotation of any first stanchion structure 121 relative to the superior structure 101 is independent of the rotation of any second stanchion structure 122 relative to the superior structure 101.

The superior structure 101 further comprises a plurality of counterweights 111. Each of the plurality of counterweights 111 is a mechanical structure that attaches to the superior structure 101. Each of the plurality of counterweights 111 forms a counterbalance that stabilizes the invention 100 as the inferior structure 102 is walking the invention 100 over the supporting surface.

The inferior structure 102 forms the load path that transfers the load of the superior structure 101 to a supporting surface. The rotation of the inferior structure 102 is manipulated by the control circuit 103 such that inferior structure 102 can walk with the superior structure 101 over a supporting surface. The inferior structure 102 comprises a first stanchion structure 121 and a second stanchion structure 122. The second stanchion structure 122 is identical to the first stanchion structure 121.

The second stanchion structure 122 is a mechanical structure. The second stanchion structure 122 attaches to the superior structure 101 such that the second stanchion structure rotates relative to the superior structure 101. The second stanchion structure 122 further comprises internal rotations that allow the second stanchion structure 122 to rotate relative to itself. The second stanchion structure 122 elevates the superior structure 101 relative to the supporting surface. The second stanchion structure 122 transfers the load of the superior structure 101 to the supporting surface. The second stanchion structure 122 is identical to the first stanchion structure 121. The control circuit 103 operates the second stanchion structure 122 independently of the first stanchion structure 121.

The first stanchion structure 121 is a mechanical structure. The control circuit 103 controls the operation of the second stanchion structure 122. Specifically, the control circuit 103 controls the rotation of the second stanchion structure 122 relative to the superior structure 101 and the internal rotations of the second stanchion structure 122 to control the walking direction and speed of the invention 100.

The first stanchion structure 121 attaches to the superior structure 101 such that the first stanchion structure 121 rotates relative to the superior structure 101. The first stanchion structure 121 further comprises internal rotations that allow the first stanchion structure 121 to rotate relative to itself. The first stanchion structure 121 elevates the superior structure 101 relative to the supporting surface. The first stanchion structure 121 transfers the load of the superior structure 101 to the supporting surface. The control circuit 103 controls the operation of the first stanchion structure 121. Specifically, the control circuit 103 controls the rotation of the first stanchion structure 121 relative to the superior structure 101 and the internal rotations of the first stanchion structure 121 to control the walking direction and speed of the invention 100. The first stanchion structure 121 comprises a first hip structure 141, a first knee structure 142, and a first ankle structure 143.

The first hip structure 141 is a mechanical structure. The first hip structure 141 attaches to the superior structure 101 such that the first hip structure 141 rotates relative to the superior structure 101. The first hip structure 141 attaches to the first knee structure 142 such that the first hip structure rotates relative to the first knee structure 142. The first hip structure 141 is an extension structure. The first hip structure 141 elevates the superior structure 101 above the first knee structure 142. The first hip structure 141 comprises an upper stanchion 161, a first hip altitude pivot 162, and a first hip altitude pivot 162 spring 163.

The upper stanchion 161 is a rigid structure. The upper stanchion 161 is a prism-shaped structure. The upper stanchion 161 contains the first hip altitude pivot 162 and the first hip altitude pivot 162 spring 163. The upper stanchion 161 forms the extension structure that elevates the superior structure 101 above the first knee structure 142.

The first hip altitude pivot 162 is a fastening structure that attaches the upper stanchion 161 to the superior structure 101. The first hip altitude pivot 162 is a rotating structure. The first hip altitude pivot 162 attaches the upper stanchion 161 to the superior structure 101 such that the upper stanchion 161 rotates around an axis of rotation that is perpendicular to the force of gravity. The first hip altitude pivot 162 spring 163 is a spring that attaches to the first hip altitude pivot 162. The rotation of the first hip altitude pivot 162 relative to the superior structure 101 causes a deformation in the first hip altitude pivot 162 spring 163 that converts the rotational energy into mechanical potential energy. The release of the mechanical potential energy stored in the first hip altitude pivot 162 spring 163 by the return of the first hip altitude pivot 162 spring 163 to its relaxed shape assists the first hip structure 141 in returning to its default position.

The first knee structure 142 is a mechanical structure. The first knee structure 142 attaches to the first hip structure 141 such that the first knee structure 142 rotates relative to the first hip structure 141. The first knee structure 142 attaches to the first ankle structure 143 such that the first knee structure 142 rotates relative to the first ankle structure 143. The first knee structure 142 is an extension structure. The first knee structure 142 elevates the first hip structure above the first ankle structure 143. The first knee structure 142 comprises a lower stanchion 171, a first knee altitude pivot 172, and a first knee altitude pivot 172 spring 173.

The lower stanchion 171 is a rigid structure. The lower stanchion 171 is a prism-shaped structure. The lower stanchion 171 contains the first knee altitude pivot 172 and the first knee altitude pivot 172 spring 173. The lower stanchion 171 forms the extension structure that elevates the first hip structure 141 above the first knee structure 142.

The first knee altitude pivot 172 is a fastening structure that attaches the lower stanchion 171 to the first hip structure 141. The first knee altitude pivot 172 is a rotating structure. The first knee altitude pivot 172 attaches the lower stanchion 171 to the first hip structure 141 such that the lower stanchion 171 rotates around an axis of rotation that is perpendicular to the force of gravity. The first knee altitude pivot 172 spring 173 is a spring that attaches to the first knee altitude pivot 172. The rotation of the first knee altitude pivot 172 relative to the first hip structure 141 causes a deformation in the first knee altitude pivot 172 spring 173 that converts the rotational energy into mechanical potential energy. The release of the mechanical potential energy stored in the first knee altitude pivot 172 spring 173 by the return of the first knee altitude pivot 172 spring 173 to its relaxed shape assists the first knee structure 142 in returning to its default position.

The first ankle structure 143 is a mechanical structure. The first ankle structure 143 attaches to the first knee structure 142 such that the first ankle structure 143 rotates relative to the first knee structure 142. The first ankle structure 143 rests on the supporting surface such that the first ankle structure 143 transfers the load of the invention to the supporting surface. The first ankle structure 143 rotates such that the first ankle structure 143 rests flush on the supporting surface. The first ankle structure 143 is an extension structure. The first ankle structure 143 elevates the first knee structure 142 above the supporting surface. The first ankle structure 143 comprises a pedestal structure 181, a first ankle altitude pivot 182, a first ankle altitude pivot 182 spring 183, a first ankle azimuth pivot 184, and a first ankle azimuth pivot 184 spring 185.

The pedestal structure 181 is a rigid structure. The pedestal structure 181 is a disk-shaped structure. The pedestal structure 181 contains the first ankle altitude pivot 182, the first ankle altitude pivot 182 spring 183, the first ankle azimuth pivot 184, and the first ankle azimuth pivot 184 spring 185. The pedestal structure 181 forms the extension structure that elevates the first knee structure 142 above the first ankle structure 143.

The first ankle altitude pivot 182 is a fastening structure that attaches the pedestal structure 181 to the first knee structure 142. The first ankle altitude pivot 182 is a rotating structure. The first ankle altitude pivot 182 attaches the pedestal structure 181 to the first knee structure 142 such that the pedestal structure 181 rotates around an axis of rotation that is perpendicular to the force of gravity. The first ankle altitude pivot 182 spring 183 is a spring that attaches to the first ankle altitude pivot 182. The rotation of the first ankle altitude pivot 182 relative to the first knee structure 142 causes a deformation in the first ankle altitude pivot 182 spring 183 that converts the rotational energy into mechanical potential energy. The release of the mechanical potential energy stored in the first ankle altitude pivot 182 spring 183 by the return of the first ankle altitude pivot 182 spring 183 to its relaxed shape assists the first ankle structure 143 in returning to its default position.

The pedestal structure 181 forms the extension structure that elevates the first knee structure 142 above the first ankle structure 143. The first ankle azimuth pivot 184 is a fastening structure that attaches the pedestal structure 181 to the first knee structure 142. The first ankle azimuth pivot 184 is a rotating structure. The first ankle azimuth pivot 184 attaches the pedestal structure 181 to the first knee structure 142 such that the pedestal structure 181 rotates around an axis of rotation that is parallel to the force of gravity. The first ankle azimuth pivot 184 spring 185 is a spring that attaches to the first ankle azimuth pivot 184. The rotation of the first ankle azimuth pivot 184 relative to the first knee structure 142 causes a deformation in the first ankle azimuth pivot 184 spring 185 that converts the rotational energy into mechanical potential energy. The release of the mechanical potential energy stored in the first ankle azimuth pivot 184 spring 185 by the return of the first ankle azimuth pivot 184 spring 185 to its relaxed shape assists the first ankle structure 143 in returning to its default position.

The control circuit 103 is an electric circuit. The control circuit 103 controls the operation of the first stanchion structure 121 of the inferior structure 102. The control circuit 103 controls the operation of the second stanchion structure 122 of the inferior structure 102. The control circuit 103 controls the rotation of the first stanchion structure 121 and the second stanchion structure 122 such that the invention 100 will walk over the supporting surface. The control circuit 103 comprises a logic circuit and a plurality of servo motors 132.

The logic circuit is an electric circuit. The logic circuit powers the operation of the plurality of servo motors 132. The logic circuit controls the operation of each of the plurality of servo motors 132. The logic circuit controls the rotation of the first stanchion structure 121 relative to the superior structure 101. The logic circuit controls the internal rotations of the first stanchion structure 121. The logic circuit controls the rotation of the second stanchion structure 122 relative to the superior structure 101. The logic circuit controls the internal rotations of the second stanchion structure 122. The logic circuit controls the ability of the invention 100 to walk by controlling the rotations of the first stanchion structure 121. The logic circuit controls the ability of the invention 100 to walk by simultaneously controlling the rotations of the second stanchion structure 122. The logic circuit operates the second stanchion structure 122 independently of the first stanchion structure 121.

Each of the plurality of servo motors 132 is a servo motor. The servo motor is defined elsewhere in this disclosure. The control circuit 103 controls the operation of each of the plurality of servo motors 132. The control circuit 103 powers the operation of the plurality of servo motors 132. The plurality of servo motors 132 provides the motive forces required to rotate the first stanchion structure 121 relative to the superior structure 101. The plurality of servo motors 132 provides the motive forces required to rotate the second stanchion structure 122 relative to the superior structure 101. The plurality of servo motors 132 provides the motive forces required for performing the internal rotations of the first stanchion structure 121. The plurality of servo motors 132 provides the motive forces required for performing the internal rotations of the second stanchion structure 122. The plurality of servo motors 132 comprises a plurality of first stanchion structure 121 servo motors and a plurality of second stanchion structure 122 servo motors.

Each of the plurality of second stanchion structure 122 servo motors is a servo motor. The servo motor is defined elsewhere in this disclosure. Each of the plurality of second stanchion structure 122 servo motors attaches to the second stanchion structure 122 of the inferior structure 102. The plurality of second stanchion structure 122 servo motors provides the motive forces that allows the second stanchion structure 122 to rotate relative to itself. The plurality of second stanchion structure 122 servo motors provides the motive forces that allows the second stanchion structure 122 to rotate relative to the superior structure 101.

The logic circuit powers the operation of each of the plurality of second stanchion structure 122 servo motors. The logic circuit controls the rotation of each of the plurality of second stanchion structure 122 servo motors. By controlling the operation is meant that the logic circuit controls the direction of rotation and the speed of rotation of each servo motor contained in the plurality of second stanchion structure 122 servo motors.

Each of the plurality of first stanchion structure 121 servo motors is a servo motor. The servo motor is defined elsewhere in this disclosure. Each of the plurality of first stanchion structure 121 servo motors attaches to the first stanchion structure 121 of the inferior structure 102. The plurality of first stanchion structure 121 servo motors provides the motive forces that allows the first stanchion structure 121 to rotate relative to itself. The plurality of first stanchion structure 121 servo motors provides the motive forces that allows the first stanchion structure 121 to rotate relative to the superior structure 101.

The logic circuit powers the operation of each of the plurality of first stanchion structure 121 servo motors. The logic circuit controls the rotation of the each of the plurality of first stanchion structure 121 servo motors. By controlling the operation is meant that the logic circuit controls the direction of rotation and the speed of rotation of each servo motor contained in the plurality of first stanchion structure 121 servo motors.

The plurality of first stanchion structure 121 servo motors comprises a first hip altitude pivot 162 servo motor 191, a first knee altitude pivot 172 servo motor 192, a first ankle altitude pivot 182 servo motor 193, and a first ankle azimuth pivot 184 servo motor 194.

The first hip altitude pivot 162 servo motor 191 is the servo motor selected from the plurality of first stanchion structure 121 servo motors that attaches to the first hip altitude pivot 162. The rotation of the first hip altitude pivot 162 servo motor 191 rotates the first hip altitude pivot such that the first hip structure 141 rotates relative to the superior structure 101.

The first knee altitude pivot 172 servo motor 192 is the servo motor selected from the plurality of first stanchion structure 121 servo motors that attaches to the first knee altitude pivot 172. The rotation of the first knee altitude pivot 172 servo motor 192 rotates the first knee altitude pivot such that the first knee structure 142 rotates relative to the first hip structure 141.

The first ankle altitude pivot 182 servo motor 193 is the servo motor selected from the plurality of first stanchion structure 121 servo motors that attaches to the first ankle altitude pivot 182. The rotation of the first ankle altitude pivot 182 servo motor 193 rotates the first ankle altitude pivot 182 such that the first ankle structure 143 rotates relative to the first knee structure 142.

The first ankle azimuth pivot 184 servo motor 194 is the servo motor selected from the plurality of first stanchion structure 121 servo motors that attaches to the first ankle azimuth pivot 184. The rotation of the first ankle azimuth pivot 184 servo motor 194 rotates the first ankle azimuth pivot 184 such that the pedestal structure 181 rotates relative to the first knee structure 142.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Altitude: As used in this disclosure, the altitude, or altitude angle, refers to an angle that is measured in a plane that is: 1) parallel to the force of gravity; and, 2) perpendicular to the azimuth.

Automatic: As used in this disclosure, automatic refers to a device, process, or a system that operates without human control, supervision or participation in the operation of the device, process, or system. The verb form of automatic is to automate.

Azimuth: As used in this disclosure, the azimuth, or azimuth angle, refers to an angle that is measured in a plane that is perpendicular to either the vertical direction or the force of gravity.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Counterbalance: As used in this disclosure, a counter balance refers to a weight substructure that is incorporated into a first object. The purpose of the counterbalance is to reduce that span of the distance between the center of mass (calculated as the first moment or mean of the mass distribution) of the first object and the center of mass of an alternate structure formed by the combination of the first object and a second object that is attached to or supported by the first object.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Robot: As used in this disclosure, a robot is a programmable electronic device that automatically performs a series of predetermined actions.

Servo Motor: As used in this disclosure, a servo motor is an electrical motor that further incorporates a feedback circuit that allows for the precise angular positioning of the electric motor.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Walk: As used in this disclosure, a walk describes a method of motion along a supporting surface. The walk is applied to an object that is elevated above the ground by two or more stanchions (commonly referred to as legs). The walk refers to a method of: a) raising, changing the position of, and lowering each leg relative to the supporting surface; such that, b) at any point in time at least one stanchion is in contact with the supporting surface.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A walking robot comprising
wherein the walking robot comprises a superior structure, an inferior structure, and a control circuit;
wherein the superior structure attaches to the inferior structure;
wherein the control circuit mounts in a structure selected from the group consisting of the superior structure and the inferior structure;
wherein the inferior structure comprises a first stanchion structure and a second stanchion structure;
wherein the superior structure further comprises a plurality of counterweights;
wherein the control circuit controls the operation of the first stanchion structure;
wherein the control circuit controls the operation of the second stanchion structure;
wherein the first stanchion structure comprises a first hip structure, a first knee structure, and a first ankle structure;
wherein the first hip structure comprises an upper stanchion, a first hip altitude pivot, and a first hip altitude pivot spring;
wherein the upper stanchion contains the first hip altitude pivot and the first hip altitude pivot spring;
wherein the upper stanchion forms the extension structure that elevates the superior structure above the first knee structure;
wherein the first hip altitude pivot is a fastening structure that attaches the upper stanchion to the superior structure;
wherein the first hip altitude pivot is a rotating structure;
wherein the upper stanchion is a rigid structure;
wherein the first hip altitude pivot attaches the upper stanchion to the superior structure such that the upper stanchion rotates around an axis of rotation that is perpendicular to the force of gravity;
wherein the first hip altitude pivot spring is a spring that attaches to the first hip altitude pivot;
wherein the rotation of the first hip altitude pivot relative to the superior structure causes a deformation in the first hip altitude pivot spring that converts the rotational energy into mechanical potential energy;
wherein the release of the mechanical potential energy stored in the first hip altitude pivot spring by the return of the first hip altitude pivot spring to its relaxed shape assists the first hip structure in returning to its default position;
wherein the first ankle structure is a mechanical structure;
wherein the first ankle structure attaches to the first knee structure such that the first ankle structure rotates relative to the first knee structure;
wherein the first ankle structure rests on the supporting surface such that the first ankle structure transfers the load of the walking robot to the supporting surface;
wherein the first ankle structure rotates such that the first ankle structure rests flush on the supporting surface.
2. The walking robot according to claim 1
wherein the walking robot is an automatic device;
wherein the walking robot is a mobile device;
wherein the inferior structure provides the motive forces that move the walking robot;
wherein the inferior structure allows the walking robot to walk;

wherein the control circuit generates the motive forces and coordinating systems that allow the inferior structure to walk.

3. The walking robot according to claim 2
wherein the superior structure is a mechanical structure;
wherein the superior structure forms the structure of the walking robot that is in a superior position relative to the inferior structure;
wherein the superior structure attaches to the inferior structure;
wherein the inferior structure is an electromechanical structure;
wherein the first stanchion structure and the second stanchion structure elevate the superior structure above a supporting surface;
wherein the rotation of the first stanchion structure relative to the superior structure is independent of the rotation of the second stanchion structure relative to the superior structure.

4. The walking robot according to claim 3
wherein each of the plurality of counterweights is a mechanical structure that attaches to the superior structure;
wherein each of the plurality of counterweights forms a counterbalance that stabilizes the walking robot as the inferior structure is walking the walking robot over the supporting surface.

5. The walking robot according to claim 4
wherein the inferior structure forms the load path that transfers the load of the superior structure to a supporting surface;
wherein the rotation of the inferior structure is manipulated by the control circuit such that inferior structure can walk with the superior structure over a supporting surface.

6. The walking robot according to claim 5
wherein the second stanchion structure is identical to the first stanchion structure;
wherein the first stanchion structure is a mechanical structure;
wherein the second stanchion structure is a mechanical structure;
wherein the first stanchion structure attaches to the superior structure such that the first stanchion structure rotates relative to the superior structure;
wherein the second stanchion structure attaches to the superior structure such that the second stanchion structure rotates relative to the superior structure;
wherein the first stanchion structure further comprises internal rotations that allow the first stanchion structure to rotate relative to itself;
wherein the second stanchion structure further comprises internal rotations that allow the second stanchion structure to rotate relative to itself;
wherein the first stanchion structure elevates the superior structure relative to the supporting surface;
wherein the second stanchion structure elevates the superior structure relative to the supporting surface;
wherein the first stanchion structure transfers the load of the superior structure to the supporting surface;
wherein the second stanchion structure transfers the load of the superior structure to the supporting surface.

7. The walking robot according to claim 6
wherein the control circuit operates the second stanchion structure independently of the first stanchion structure;
wherein, the control circuit controls the rotation of the first stanchion structure relative to the superior structure and the internal rotations of the first stanchion structure to control the walking direction and speed of the walking robot;
wherein the control circuit controls the rotation of the second stanchion structure relative to the superior structure and the internal rotations of the second stanchion structure to control the walking direction and speed of the walking robot.

8. The walking robot according to claim 7
wherein the first hip structure is a mechanical structure;
wherein the first hip structure attaches to the superior structure such that the first hip structure rotates relative to the superior structure;
wherein the first hip structure attaches to the first knee structure such that the first hip structure rotates relative to the first knee structure;
wherein the first knee structure is a mechanical structure;
wherein the first knee structure attaches to the first hip structure such that the first knee structure rotates relative to the first hip structure;
wherein the first knee structure attaches to the first ankle structure such that the first knee structure rotates relative to the first ankle structure.

9. The walking robot according to 8
wherein the first hip structure is an extension structure;
wherein the first hip structure elevates the superior structure above the first knee structure;
wherein the first knee structure is an extension structure;
wherein the first knee structure elevates the first hip structure above the first ankle structure;
wherein the first ankle structure is an extension structure;
wherein the first ankle structure elevates the first knee structure above the supporting surface.

10. The walking robot according to 9
wherein the first knee structure comprises a lower stanchion, a first knee altitude pivot, and a first knee altitude pivot spring;
wherein the lower stanchion is a rigid structure;
wherein the lower stanchion contains the first knee altitude pivot and the first knee altitude pivot spring;
wherein the lower stanchion forms the extension structure that elevates the first hip structure above the first knee structure;
wherein the first knee altitude pivot is a fastening structure that attaches the lower stanchion to the first hip structure;
wherein the first knee altitude pivot is a rotating structure;
wherein the first knee altitude pivot attaches the lower stanchion to the first hip structure such that the lower stanchion rotates around an axis of rotation that is perpendicular to the force of gravity;
wherein the first knee altitude pivot spring is a spring that attaches to the first knee altitude pivot;
wherein the rotation of the first knee altitude pivot relative to the first hip structure causes a deformation in the first knee altitude pivot spring that converts the rotational energy into mechanical potential energy;
wherein the release of the mechanical potential energy stored in the first knee altitude pivot spring by the return of the first knee altitude pivot spring to its relaxed shape assists the first knee structure in returning to its default position.

11. The walking robot according to 10
wherein the first ankle structure comprises a pedestal structure, a first ankle altitude pivot, a first ankle altitude pivot spring, a first ankle azimuth pivot, and a first ankle azimuth pivot spring;

wherein the pedestal structure is a rigid structure;

wherein the pedestal structure is a disk-shaped structure;

wherein the pedestal structure contains the first ankle altitude pivot, the first ankle altitude pivot spring, the first ankle azimuth pivot, and the first ankle azimuth pivot spring;

wherein the pedestal structure forms the extension structure that elevates the first knee structure above the first ankle structure;

wherein the first ankle altitude pivot is a fastening structure that attaches the pedestal structure to the first knee structure;

wherein the first ankle altitude pivot is a rotating structure;

wherein the first ankle altitude pivot attaches the pedestal structure to the first knee structure such that the pedestal structure rotates around an axis of rotation that is perpendicular to the force of gravity;

wherein the first ankle altitude pivot spring is a spring that attaches to the first ankle altitude pivot;

wherein the rotation of the first ankle altitude pivot relative to the first knee structure causes a deformation in the first ankle altitude pivot spring that converts the rotational energy into mechanical potential energy;

wherein the release of the mechanical potential energy stored in the first ankle altitude pivot spring by the return of the first ankle altitude pivot spring to its relaxed shape assists the first ankle structure in returning to its default position;

wherein the pedestal structure forms the extension structure that elevates the first knee structure above the first ankle structure;

wherein the first ankle azimuth pivot is a fastening structure that attaches the pedestal structure to the first knee structure;

wherein the first ankle azimuth pivot is a rotating structure;

wherein the first ankle azimuth pivot attaches the pedestal structure to the first knee structure such that the pedestal structure rotates around an axis of rotation that is parallel to the force of gravity;

wherein the first ankle azimuth pivot spring is a spring that attaches to the first ankle azimuth pivot;

wherein the rotation of the first ankle azimuth pivot relative to the first knee structure causes a deformation in the first ankle azimuth pivot spring that converts the rotational energy into mechanical potential energy;

wherein the release of the mechanical potential energy stored in the first ankle azimuth pivot spring by the return of the first ankle azimuth pivot spring to its relaxed shape assists the first ankle structure in returning to its default position.

12. The walking robot according to 11 wherein the control circuit further comprises a plurality of servo motors;

wherein each of the plurality of servo motors is a servo motor;

wherein the control circuit controls the operation of each of the plurality of servo motors;

wherein the control circuit powers the operation of the plurality of servo motors;

wherein the plurality of servo motors provides the motive forces required to rotate the first stanchion structure relative to the superior structure;

wherein the plurality of servo motors provides the motive forces required to rotate the second stanchion structure relative to the superior structure;

wherein the plurality of servo motors provides the motive forces required for performing the internal rotations of the first stanchion structure;

wherein the plurality of servo motors provides the motive forces required for performing the internal rotations of the second stanchion structure;

wherein the plurality of servo motors comprises a plurality of first stanchion structure servo motors and a plurality of second stanchion structure servo motors;

wherein each of the plurality of second stanchion structure servo motors is a servo motor;

wherein each of the plurality of second stanchion structure servo motors attaches to the second stanchion structure of the inferior structure;

wherein the plurality of second stanchion structure servo motors provides the motive forces that allows the second stanchion structure to rotate relative to itself;

wherein the plurality of second stanchion structure servo motors provides the motive forces that allows the second stanchion structure to rotate relative to the superior structure.

13. The walking robot according to 12 wherein the plurality of first stanchion structure servo motors comprises a first hip altitude pivot servo motor, a first knee altitude pivot servo motor, a first ankle altitude pivot servo motor, and a first ankle azimuth pivot servo motor;

wherein the first hip altitude pivot servo motor is the servo motor selected from the plurality of first stanchion structure servo motors that attaches to the first hip altitude pivot;

wherein the rotation of the first hip altitude pivot servo motor rotates the first hip altitude pivot such that the first hip structure rotates relative to the superior structure;

wherein the first knee altitude pivot servo motor is the servo motor selected from the plurality of first stanchion structure servo motors that attaches to the first knee altitude pivot;

wherein the rotation of the first knee altitude pivot servo motor rotates the first knee altitude pivot such that the first knee structure rotates relative to the first hip structure;

wherein the first ankle altitude pivot servo motor is the servo motor selected from the plurality of first stanchion structure servo motors that attaches to the first ankle altitude pivot;

wherein the rotation of the first ankle altitude pivot servo motor rotates the first ankle altitude pivot such that the first ankle structure rotates relative to the first knee structure;

wherein the first ankle azimuth pivot servo motor is the servo motor selected from the plurality of first stanchion structure servo motors that attaches to the first ankle azimuth pivot;

wherein the rotation of the first ankle azimuth pivot servo motor rotates the first ankle azimuth pivot such that the pedestal structure rotates relative to the first knee structure.

\* \* \* \* \*